US009456363B2

(12) United States Patent
Rosin et al.

(10) Patent No.: US 9,456,363 B2
(45) Date of Patent: Sep. 27, 2016

(54) CELL MANAGEMENT METHOD AND A CORRESPONDING CONTROLLER THEREOF IN A RADIO COMMUNICATIONS NETWORK

(75) Inventors: Frédéric Rosin, Montesson (FR); Lannig Tanneau, Montigny le Bretonneux (FR)

(73) Assignee: CASSIDIAN SAS, Elancourt (FR)

(*) Notice: Subject to any disclaimer, the term of this patent is extended or adjusted under 35 U.S.C. 154(b) by 127 days.

(21) Appl. No.: 13/580,201

(22) PCT Filed: Feb. 25, 2011

(86) PCT No.: PCT/EP2011/052829
§ 371 (c)(1),
(2), (4) Date: Aug. 21, 2012

(87) PCT Pub. No.: WO2011/104350
PCT Pub. Date: Sep. 1, 2011

(65) Prior Publication Data
US 2012/0322485 A1    Dec. 20, 2012

(30) Foreign Application Priority Data

Feb. 26, 2010  (FR) ..................................... 10 51369

(51) Int. Cl.
*H04W 24/04* (2009.01)
*H04W 48/12* (2009.01)

(52) U.S. Cl.
CPC ............. *H04W 24/04* (2013.01); *H04W 48/12* (2013.01)

(58) Field of Classification Search
USPC ....................... 455/41.1, 426.1, 445; 370/252
See application file for complete search history.

(56) References Cited

U.S. PATENT DOCUMENTS

| 5,623,532 A | 4/1997 | Houde et al. |
| 5,995,831 A * | 11/1999 | Gulliford et al. .......... 455/426.1 |
| 2002/0085503 A1 | 7/2002 | Hulyalkar et al. |

FOREIGN PATENT DOCUMENTS

| DE | 199 30 423 A1 | 1/2001 |
| EP | 0 998 154 B1 | 1/2006 |

OTHER PUBLICATIONS

International Search Report as issued for PCT/EP2011/052829.

* cited by examiner

*Primary Examiner* — Junpeng Chen
(74) *Attorney, Agent, or Firm* — Pillsbury Winthrop Shaw Pittman LLP

(57) ABSTRACT

A method of managing a cell of a radio telecommunication network, the cell including a site controller to control, via a packet network, a plurality of transmitters distributed over different sites of the cell such that the transmitters of the different sites transmitting over a same frequency band form a transmission channel, a channel of the transmission channel being a control channel dedicated to a transmission of signals relative to an operation of the cell, the signals including general operating signals and specific operating signals, the method including: transmitting a request comprising general operating signals from the site controller to a transmitter selected by said site controller to control storage of general operating signals in the selected transmitter, and to control handling of a transmission of the general operating signals addressed to all terminals present in the cell over the control channel in case of failure of the site controller and/or of the packet network.

10 Claims, 1 Drawing Sheet

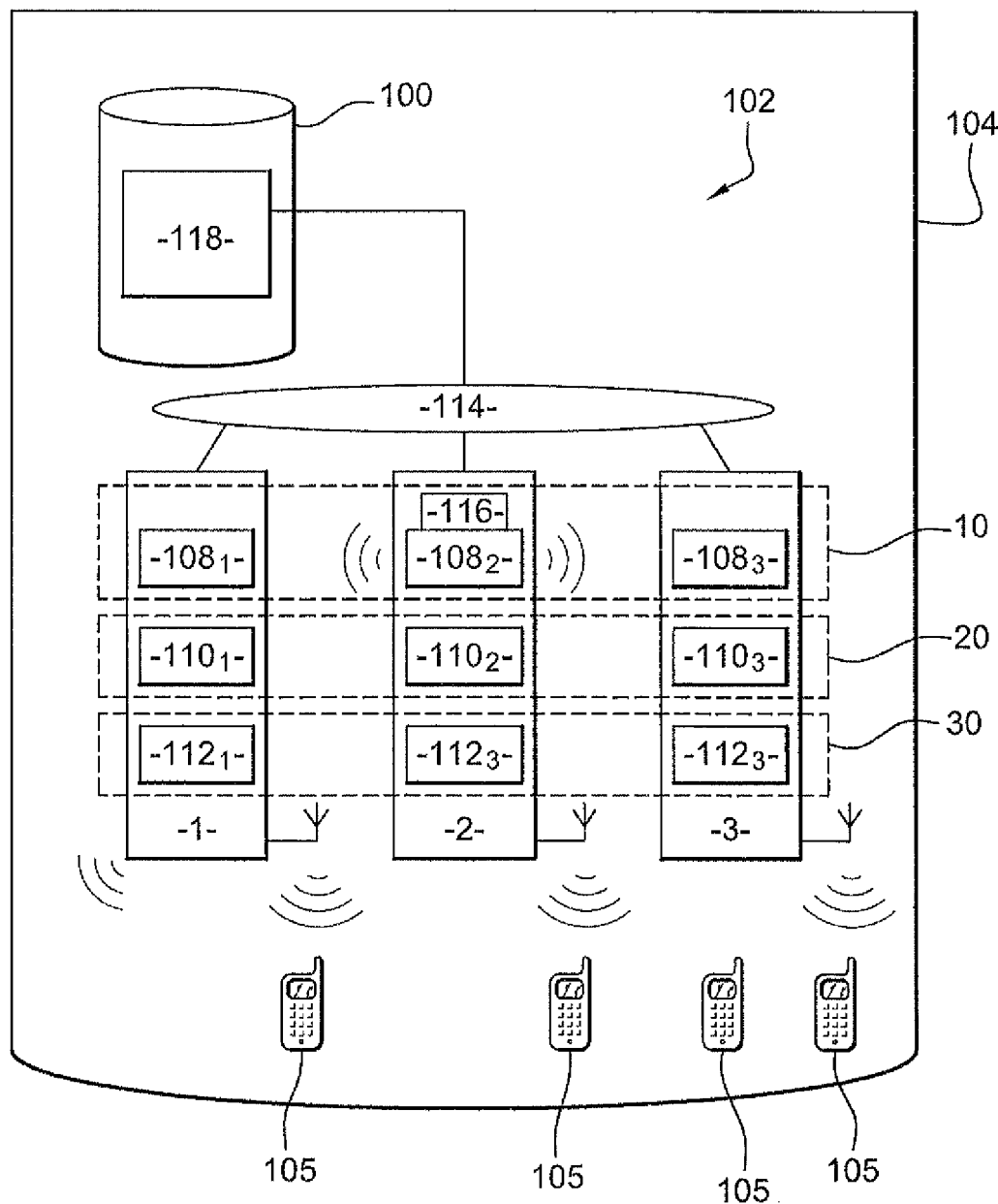

CELL MANAGEMENT METHOD AND A CORRESPONDING CONTROLLER THEREOF IN A RADIO COMMUNICATIONS NETWORK

CROSS REFERENCE TO RELATED APPLICATIONS

This application is the U.S. National Stage of PCT/EP2011/052829, filed Feb. 25, 2011, which in turn claims priority to French Patent Application No. 1051369, filed Feb. 26, 2010, the entire contents of all applications are incorporated herein by reference in their entireties.

FIELD

The present invention relates to a method for managing a cell from a radio telecommunication network. In particular, the invention finds its application in case of failure of a piece of equipment of a radio communication network.

BACKGROUND

Utilizing a controller, also called a "base station controller," in a radio communication network to control sites that notably comprise at least one transmit-receive transmitter and an antenna is known.

The role of such a site, such as a base station, is to transmit and receive communications relative to terminals located in an associated zone or cell.

In addition, transmitters present on different sites may transmit over a same frequency band so as to form a transmission channel which is allocated dynamically (or trunked) to the communications of the terminals as they are picked up by the site.

In this case, it is also known that the site controller selects one of the transmission channels such as a control channel to transmit operating signals from the cell to the terminals of the cell.

There are two types of operating signals, i.e.:
  General operating signals, later known as BBS for "Background Broadcast Signaling," regularly transmitted by the control channel to transmit to the terminals general information on the operation of the cell. In principle, these general operating signals code static information such as, for example, the identification of the cell in the network or the parameters of adjacent cells, such as their identifications.
  Specific operating signals, named occasional signals or OS for "Occasional Signaling," specifically transmitted by the cell to respond to a particular request from a terminal, for example relative to phonic services or to services to register terminals in a cell.

These operating signals are constructed and programmed by the site controller and then transmitted to different control channel transmitters via a packet network of the Internet network type. Once the operating signals are received, the control channel transmitters transmit them directly to the different terminals of the cell.

Such a structure presents the disadvantage that a simple failure, for example of a site controller and/or of a packet network transmitting signals between a controller and a transmitter, may lead to an operating signal transmission failure that leads to a massive migration of all the terminals managed by the faulty cell to a new adjacent cell.

In this case, many requests for registration are transmitted, in a practically simultaneous manner, by the terminals migrating to the new adjacent cell that is then generally overwhelmed by this massive influx of terminals and cannot satisfactorily respond—in terms of time and/or signal quality—to all of these requests.

SUMMARY

The present invention aims to remedy this disadvantage by limiting the risk of a massive influx of terminals migrating from one cell presenting a failure to another adjacent cell. The invention results from the observation that operating signals transmitted by a cell may, at least in part, be transmitted by a transmitter from a site despite a failure of a controller and/or a packet network of this cell.

Indeed, it appears that a transmission of general operating signals may simply be established by reproducing, at the transmitter level, general operating signals transmitted prior to the failure.

This is why the invention relates to a method for managing a cell from a radio telecommunication network, this cell comprising a site controller intended to control, via a packet network, a plurality of transmitters distributed over different sites of the cell such that the transmitters of these different sites transmitting over a same frequency band form a transmission channel, a channel of said transmission channels being a control channel dedicated to the transmission of signals relative to the operation of the cell, said signals comprising general operating signals and specific operating signals, characterized in that the method comprises a transmission of a request comprising general operating signals from the site controller to at least one transmitter selected by said site controller to control storage of general operating signals in said selected transmitter, and to control handling of a transmission of said general operating signals addressed to all of the terminals present in the cell over said control channel in case of failure of the site controller and/or the packet network.

Thanks to the invention, a cell may continue to transmit general operating signals such that the terminals, present under the cell and not executing a specific operation requiring specific operating signals, may not detect the practically simultaneous failure of the controller and/or packet network.

Indeed, the terminals do not require their migration to another cell as they do not require a specific operation, typically to establish communication, which thus statistically limits and distributes in time the moment when a terminal detects the failure of the cell.

In one embodiment, the method comprises the step of transmitting the request comprising general operating signals to all of the transmitters transmitting over said control channel to store general operating signals in each of the transmitters.

According to an embodiment, the method comprises the step for said selected transmitter to communicate temporary references to the other transmitters transmitting over said control channel so that the transmitters of said control channel transmit said general operating signals to the terminals in a synchronized manner.

In one embodiment, the method comprises the step for the site controller of communicating to the selected transmitter indications relative to the nature, identity and/or number of general operating signals to transmit.

According to one embodiment, the method comprises the step for the selected transmitter of determining the transmission of general operating signals in an autonomous manner from among the stored general operating signals, according to configuration parameters of the transmitter.

The invention also relates to a site controller of a radio telecommunication network intended to control, via a packet network, a plurality of transmitters distributed over different sites of a cell associated with said site controller, such that the transmitters of these different sites transmitting over a same frequency band form a transmission channel, a channel of said transmission channels being a control channel dedicated to the transmission of signals relative to the operation of the cell, said signals comprising general operating signals and specific operating signals, characterized in that said site controller comprises means to transmit a request comprising general operating signals from the site controller to at least one transmitter selected by said site controller to control storage of general operating signals in said selected transmitter, and to control handling of a transmission of said general operating signals addressed to all of the terminals present in the cell over said control channel in case of failure of the site controller and/or the packet network.

The invention also relates to a transmitter intended to be controlled, via a packet network, by a site controller, from among a plurality of transmitters distributed over different sites of a cell associated with said site controller, such that the transmitters of these different sites transmitting over a same frequency band form a transmission channel, a channel of said transmission channels being a control channel dedicated to the transmission of signals relative to the operation of the cell, said signals comprising general operating signals and specific operating signals, characterized in that said transmitter comprises means to store general operating signals and means to handle a transmission of said general operating signals addressed to all of the terminals present in the cell over said control channel in case of failure of the site controller and/or the packet network.

BRIEF DESCRIPTION OF THE DRAWING

The invention will be better understood upon reading the following description, given only for illustrative and non-limiting purposes, with reference to the attached drawing in which a schematic view of a cell in conformance with the invention is represented.

DETAILED DESCRIPTION

In reference to this FIGURE, a site controller 100 of a radio communication network 102, transmitting and receiving radio communications in a cell 104 whose radio resources are dynamically managed, known as a trunked network, is represented.

More precisely, this site controller 100 allocates its transmission resources when terminals 105 located in its cell 104 are handled.

For that purpose, the controller 100 controls a plurality of sites 1 to 1 such that each site i, with i between 1 and 1, comprises a plurality of transmitters transmitting over distinct frequency bands to terminals 105.

In the example illustrated in the attached FIGURE, one takes as an example later in the document the case of a cell comprising 3 sites 1, 2 and 3, each site being equipped with three transmitters $108_i$, $110_i$ and $112_i$ each establishing a suitable transmission channel, i.e., each site establishes three transmission channels 10, 20 and 30. However, the invention applies whatever the number of transmitters and whatever the number of channels.

In addition, the transmitters $108_1$, $108_2$ and $108_3$, transmit from different respective sites 1, 2 or 3 over a same frequency band thus forming a first transmission channel 10 in cell 104. Similarly, transmitters $110_1$, $110_2$ and $110_3$ transmit over a second channel 20 and transmitters $112_1$, $112_2$ and $112_3$ transmit over a third channel 30 established in this example of a cell.

The site controller 100 selects for each channel 10, 20 and 30 a master transmitter from among the transmitters transmitting over the same transmission channel. The role of this master transmitter is to synchronize the transmission from all transmitters of the same channel of a message to the terminals of the cell. This synchronization may be carried out, for example, by means of GPS "Global Positioning Signal" satellite signals such that each transmitter receives the message to transmit accompanied by a transmission time to reach to transmit the message at the same time over the associated transmission channel. It is also possible to provide that the master transmitter communicates temporary references to the other transmitters of the associated transmission channel such as radio transmission times of messages, durations of these messages, in order to synchronize the transmission of messages.

Site controller 100 selects each master transmitter in a predefined or random manner, the selection of one or more master transmitters may change during the operation of the cell.

As already described, it is known that the controller 100 selects at least one channel—channel 10 in this example—as the control channel whose frequency band is notably established to transmit from transmitters transmitting in said channel 10 to different terminals 105 operating signals generated by controller 100. The two other channels 20 and 30 are dynamically allocated by the controller 100 to a communication during establishment of the latter. It is to be noted that, in particular, during a detected failure of the control channel, the site controller may at any time select another transmission channel as the control channel.

These operating signals are constructed and programmed by the site controller 100 and are then transmitted by an interface of the controller to at least one of the control channel transmitters via an IP packet network 114.

In conformance with a first embodiment of the invention, the site controller 100 transmits to the master transmitter $108_2$ of control channel 10 a request containing general operating signals to control storage of general operating signals in the master transmitter and also to control handling of the transmission of these general operating signals to other transmitters of the control channel and later to all terminals of the cell. Site controller 100 is equipped with means 118 handling the transmission to master transmitter $108_2$ of requests comprising general operating signals to control the storage of said signals and the handling of their transmission by master transmitter 108.

Upon receipt of this request or prior to this request, the master transmitter establishes means 116 to store and to transmit general operating signals in a recurring or regular manner. For that purpose, these means 116 may comprise a memory to store general operating signals regularly transmitted by controller 100. Thus in case of dysfunction of the site controller 100 and/or packet network 114, the master transmitter continues to manage the transmission of operating signals stored in the memory of means 116.

In addition, means 116 comprise a general operating signal transmission device accompanied by an indication of synchronization in relation to other transmitters $108_1$ and $108_3$ of control channel 10 such that the latter also transmit in a synchronized manner general operating signals to terminals 105. In this case, according to variations, means 116 of the master transmitter may utilize packet network 114 and/or radio transmissions to transmit general operating signals stored in the memory to other transmitters connected to the control channel.

Thus, the handling of the transmission (by means 116 and controlled by controller 100) only of said general operating signals addressed to all of the terminals present in the cell over said control channel 10 in case of failure of site controller 100 and/or packet network 114 via master transmitter 108$_2$ prevents the terminals only receiving general signals from detecting the failure of site controller 100. Thus, these terminals are not going to migrate to another cell during a site controller 100 failure.

Thus, the master transmitter 108$_2$ serves as an intermediary to transmit only general operating signals addressed to all of the terminals present in the cell in case of the failure of site controller 100.

The transmission of specific operating signals addressed to the terminals present in the cell is in turn not handled in case of failure of site controller 100. Thus, the terminals requesting specific operating signals are going to migrate to another cell during a failure of site controller 100 since they will detect said failure.

In a variant, site controller 100 orders all of transmitters 108$_1$, 108$_2$, 108$_3$ of control channel 10 to store general operating signals, each of the transmitters thus establishing means 116 comprising at least one memory.

The transmission of general operating signals is then triggered by the master transmitter.

The advantage of this variant is a selection of another master transmitter in another site of the cell without discontinuity of the transmission of general operating signals.

The present invention is open to many variants. For example, one may provide that the site controller 100 comprises means to communicate to the master transmitter 108$_2$ indications relatives to the nature, identity and/or number of general operating signals to transmit.

One may also provide that the master controller 108$_2$ comprises means to determine the transmission of general operating signals autonomously from among the general operating signals stored, for example according to the transmitter 108$_2$ initialization or configuration parameters. In this case the transmitter 108$_2$ stores the operating signals thus determined and also handles the transmission of the latter. The initialization or configuration parameters may typically enable the periodicity of the transmission of general operating signals to be defined.

The invention claimed is:

1. A method of managing a cell of a radio telecommunication network, the cell comprising a site controller configured to control, via a packet network, a plurality of transmitters distributed over different sites of the cell such that the transmitters of the different sites transmitting over a same frequency band form a transmission channel, a channel of said transmission channel being a control channel dedicated to a transmission of signals relative to an operation of the cell, said signals comprising general operating signals and specific operating signals, the method comprising: transmitting a request comprising general operating signals from the site controller to a transmitter selected by said site controller to control storage of general operating signals in said selected transmitter, and to control handling of a transmission of said general operating signals addressed to all terminals present in the cell over said control channel in case of failure of the site controller and/or of the packet network such that in response to a failure of the site controller and/or of the packet network, the terminals continue to communicate on the transmission channel in the absence of a communication establishing operation and corresponding migration to a different cell, such that each terminal does not migrate until it requires a specific operating signal from the failed site controller and/or packet network, whereby migration of the terminals to the different cell is distributed in time in response to time distributed detection of the failure.

2. The managing method according to claim 1, comprising transmitting the request comprising general operating signals to all of the transmitters transmitting over said control channel to store the general operating signals in each of these transmitters.

3. The managing method according to claim 2, comprising, for said selected transmitter, communicating temporary references to the other transmitters transmitting over said control channel so that the transmitters of said control channel transmit said general operating signals to the terminals in a synchronized manner.

4. The managing method according to claim 1, comprising, for the site controller, communicating to the selected transmitter indications relatives to the nature, identity and/or number of general operating signals to transmit.

5. The managing method according to claim 1, comprising, for the selected transmitter, determining the transmission of general operating signals autonomously from among the stored general operating signals, according to the transmitter configuration parameters.

6. A site controller of a radio telecommunication network configured to control, via a packet network, a plurality of transmitters distributed over different sites of a cell associated with said site controller such that the transmitters of the different sites transmitting over a same frequency band form a transmission channel, a channel of said transmission channel being a control channel dedicated to the transmission of signals relative to the operation of the cell, said signals comprising general operating signals and specific operating signals the site controller comprising a transmitter configured to transmit a request comprising general operating signals from the site controller to at least one transmitter selected by said site controller to control storage of general operating signals in said selected transmitter, and to control handling of a transmission of said general operating signals addressed to all of the terminals present in the cell over said control channel in case of failure of the site controller and/or of the packet network such that in response to a failure of the site controller and/or of the packet network, the terminals continue to communicate on the transmission channel in the absence of a communication establishing operation and corresponding migration to a different cell, such that each terminal does not migrate until it requires a specific operating signal from the failed site controller and/or packet network, whereby migration of the terminals to the different cell is distributed in time in response to time distributed detection of the failure.

7. A transmitter configured to be controlled, via a packet network, by a site controller from among a plurality of transmitters distributed over different sites of a cell associated with said site controller such that the transmitters of the different sites transmitting over a same frequency band form a transmission channel, a channel of said transmission channel being a control channel dedicated to the transmission of signals relative to the operation of the cell, said signals comprising general operating signals and specific operating signals, said transmitter comprising a storage device configured to store the general operating signals, and a transmission handler device configured to handle a transmission of said general operating signals addressed to all of the terminals present in the cell over said control channel in case of failure of the site controller and/or of the packet network such that in response to a failure of the site controller and/or of the packet network, the terminals continue to communicate on the transmission channel in the absence of a communication establishing operation and corresponding migration to a different cell, such that each terminal does not migrate until it requires a specific operating signal from the failed site controller and/or packet network, whereby migration of the terminals to the different cell is distributed in time in response to time distributed detection of the failure.

8. A method as in claim 1, wherein a failure of the site controller and/or the packet network comprises an interruption of the receipt of general operating signals by the transmitter.

9. A site controller as in claim 6, wherein a failure of the site controller and/or the packet network comprises an interruption of the receipt of general operating signals by the transmitter.

10. A transmitter as in claim 7, wherein a failure of the site controller and/or the packet network comprises an interruption of the receipt of general operating signals by the transmitter.

* * * * *